United States Patent [19]

Whalen et al.

[11] Patent Number: 4,640,771

[45] Date of Patent: Feb. 3, 1987

[54] FLUID INTAKE SCREENING DEVICE

[75] Inventors: Charles E. Whalen, East Peoria; Wilbur G. Hoover, Delavan, both of Ill.

[73] Assignee: Caterpillar, Inc., Peoria, Ill.

[21] Appl. No.: 439,167

[22] Filed: Nov. 4, 1982

[51] Int. Cl.$^4$ ............................................. B01D 27/08
[52] U.S. Cl. ..................................... 210/167; 210/437; 210/456; 210/457
[58] Field of Search ............... 210/101, 167, 168, 172, 210/416.4, 416.5, 435, 437, 456, 457, DIG. 12, 441, 445; 123/196 A

[56] References Cited

U.S. PATENT DOCUMENTS

| | | | |
|---|---|---|---|
| 880,240 | 2/1908 | Overhiser | 210/172 |
| 1,305,735 | 6/1919 | Morris | 210/168 |
| 1,694,668 | 2/1928 | Peters | 210/172 |
| 1,800,585 | 4/1931 | Woolson | 210/416.5 |
| 2,057,779 | 10/1936 | Jacobs | 210/172 |
| 2,744,776 | 5/1956 | Brown | 210/172 |
| 2,788,129 | 4/1957 | Thompson | 210/457 |
| 3,447,685 | 6/1969 | Bircher | 210/167 |
| 3,456,799 | 7/1969 | Musial | 210/437 |
| 3,662,887 | 5/1972 | Uhlhorn, Jr. | 210/416.5 |
| 4,082,665 | 4/1978 | Schneider et al. | 210/167 |
| 4,279,746 | 7/1981 | Leutz | 210/420 |

Primary Examiner—Richard V. Fisher
Assistant Examiner—Wanda L. Millard
Attorney, Agent, or Firm—Charles E. Lanchantin, Jr.

[57] ABSTRACT

A fluid intake screening device (10) is installed in a case (12) defining a sump (14), an opening (20), and an intake passage (28). A tubular baffle member (36) extends from the opening (20) into the sump (14), supports a tubular filter assembly (34) within it, and defines a chamber (52) therebetween. The baffle member (36) has a slot (54) for controllably directing fluid from the sump (14) to the chamber (52). An indexing apparatus (56) positions the slot (54) of the baffle member (36) and adjacent the bottom of the sump (14) and minimizes fluid aeration and turbulence with low fluid levels. A closure apparatus (38) can be removed from the case (12) to permit servicing of the filter assembly (34).

11 Claims, 3 Drawing Figures

FLUID INTAKE SCREENING DEVICE

DESCRIPTION

1. Technical Field

This invention relates generally to a device installed in a sump on the suction side of a fluid pump, and more particularly to an intake screening or filtering device having improved flow characteristics and convenient serviceability.

2. Background Art

The fluid intake systems associated with the power plant, transmission or drive train sumps of vehicles are occasionally sensitive to low fluid levels in the sumps. An intake passage associated with the suction port of a pump usually extends toward the bottom of the sump, and the distal end thereof is often connected to a screen or filter in order to prevent deleterious matter collected at the bottom of the sump from entering the system. However, when the fluid level is low, such as when the vehicle is operated over uneven terrain, the suction rate of the pump can cause surface turbulence or the formation of a vortex sufficient to undesirably allow air to be drawn into the intake passage. Such aeration can markedly reduce the flow rate through the system and detrimentally influence the efficiency thereof.

Where space is limited or where the fluid level is normally shallow these problems are compounded. For example, inaccurate readings can be taken by a dipstick if the end of the dipstick is located in the region of the vortex. Also, the screen or filter assembly should be compactly constructed and yet be easily removed for servicing.

The present invention is directed to overcoming one or more of the problems as set forth above.

3. Disclosure of the Invention

In one aspect of the invention a fluid intake screening device is disclosed in a case defining a sump, an opening, and an intake passage communicating with the opening. A tubular baffle member is connected to the case and extends from the opening into the sump while supporting a tubular filter assembly within it. A tubular chamber is defined therebetween and the baffle member defines means for controllably directing fluid flow from the sump to the chamber in a limited region of the baffle member. Moreover, closure means is provided for blocking the outer end of the opening in the case and upon the release thereof permits the convenient removal of the filter assembly and the baffle member from the case for servicing.

In another aspect of the invention a fluid intake screening device is adapted to be inserted into, and released from, a case defining a sump, an opening having inner and outer ends, and an outwardly facing shoulder. The intake screening device includes a filter assembly having a filter element and a skeleton frame which supports the filter element, a baffle member which extends from the inner end of the opening into the sump and supports the skeleton frame, and a closure assembly which blocks the outer end of the opening and urges the skeleton frame against the baffle member and the baffle member into seated engagement with the shoulder.

Advantageously, the baffle member has a slot therein which is located at the bottom of the sump so that fluid turbulence is minimized even with low fluid levels. Indexing means is provided to assure that during installation the slot is installed at the bottom so that fluid is drawn therethrough at essentially a maximum fluid depth to avoid aeration problems or inaccurate readings on any nearby dipstick.

BEST MODE FOR CARRYING OUT THE INVENTION

Figure 1:
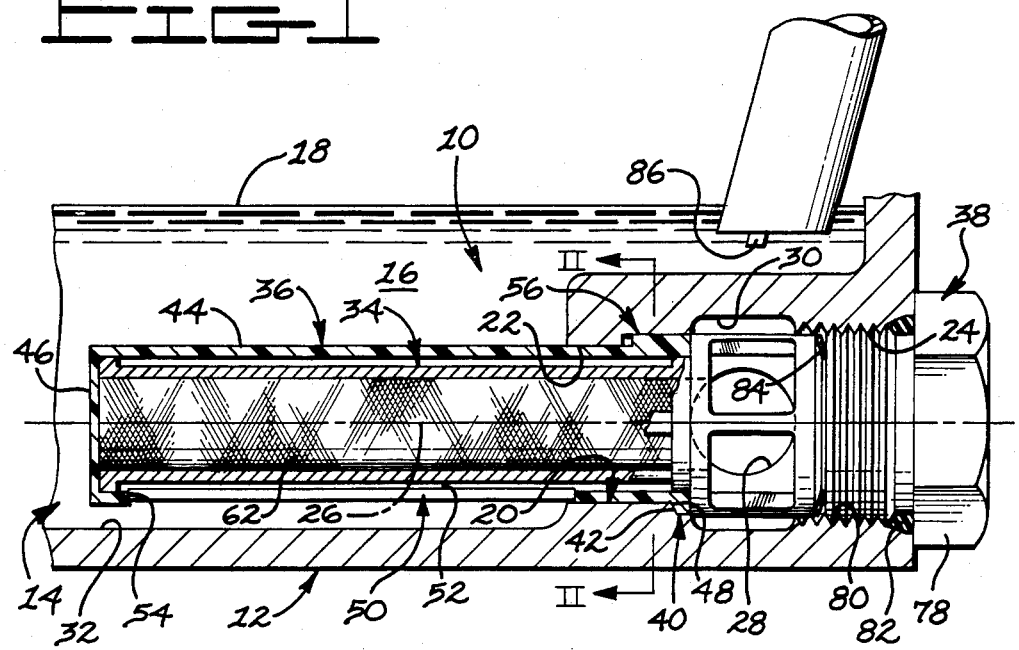
FIG. 1 is a diagrammatic, side elevational, and sectionalized view of a fluid intake screening device constructed in accordance with the present invention and showing certain portions thereof in elevation for clarity.

As is shown in FIG. 1, a fluid intake screening device 10 includes a case 12 defining a sump or reservoir 14 for containing a liquid 16 such as oil, hydraulic fluid or the like. A relatively low liquid surface level 18 is illustrated which is generally representative of the condition experienced with certain vehicular transmission or drive train sumps, for example. The case also defines a stepped cylindrical opening 20 therethrough having an inner end 22 and an outer end 24 disposed along a horizontal axis 26, and a pump intake passage 28 communicating at a right angle with the opening at an enlarged annulus 30 intermediate the ends.

Basically, the intake screening device 10 of the instant embodiment includes three principle parts which are releasably secured to the case 12 adjacent a floor or bottom portion 32 thereof. These parts are a tubular filter assembly 34, a tubular baffle member 36, and a closure assembly 38.

The tubular baffle member 36 has a flanged head portion 40 defining an inwardly facing tapered shoulder 42, an elongate hollow cylindrical portion 44, and an inner end closure wall 46 of circular shape. An outwardly facing tapered shoulder 48 is defined within the inner end 22 of the stepped opening 20 of the case 12 which forms a cooperating seat for the tapered shoulder of the baffle member. This simple construction of the baffle member lends itself to its being formed of plastic material.

Figure 2:
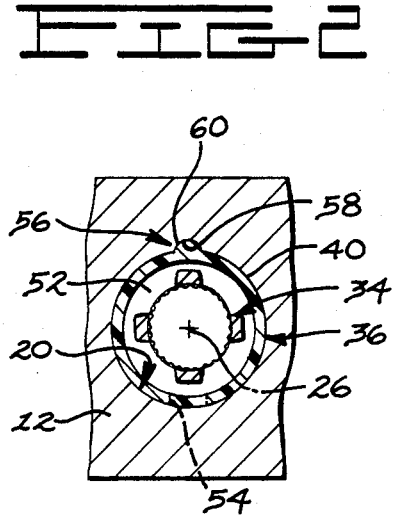
FIG. 2 is a cross-sectional view of the fluid intake screening device of FIG. 1 as taken along the line II—II thereof.

In accordance with one aspect of the invention, the baffle member 36 defines flow directing means 50 for controllably directing fluid flow from the sump 14 to a tubular chamber 52 defined between the outer baffle member and the inner filter assembly 34 through a limited peripheral region of the baffle member. In the illustrated example the flow directing means is a single elongate slot 54 of substantially rectangular form. And, in order to assure the proper placement of the slot in a juxtaposed position adjacent the floor portion 32, indexing means 56 is provided intermediate the case 12 and the baffle member as is illustrated in the upper portions of FIGS. 1 and 2. Particularly, the indexing means 56 includes a depression 58 of arcuate or semicylindrical cross section in the surface of the inner end 22 of the case opening 20, and a correspondingly rounded tab or projection 60 formed on the periphery of the head portion 40 of the baffle member immediately axially inwardly of the shoulder 42.

Figure 3:
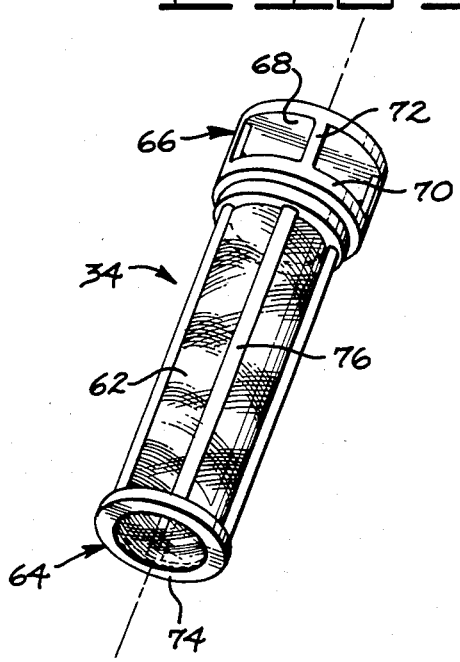
FIG. 3 is a diagrammatic perspective view of the tubular filter assembly illustrated in FIGS. 1 and 2.

As shown best in FIG. 3, the tubular filter assembly 34 includes a screen or filter element 62 of hollow cylindrical shape and a skeleton frame 64 sufficient to support the element. In this regard, while a screen is illustrated in the drawings, it is to be understood that a conventional pleated paper filter element or similar tubular cleaning element, can be substituted therefor without departing from the spirit of the present invention. The frame is needed, however, to concentrically position the periphery of the element radially away from the inner surface of the baffle member 36. Preferably, the skeleton frame includes a flanged head portion 66 defined by a cylindrical outer end plate 68, an annular and stepped intermediate plate 70, and a plurality of relatively short struts or ribs 72 extending longitudinally therebetween. The opposite end of the frame has an annular inner end plate 74, and a plurality of elongate and radially flat struts or ribs 76 extending axially outwardly therefrom to be integrally connected to the intermediate plate 70.

Referring now to the closure assembly 38 shown in FIG. 1, it can be noted to include a conventional headed fastener 78 screwthreadably received in threads 80 defined within the outer end 24 of the opening 20 in the case 12. Preferably, an annular seal member 82 is disposed next to the head of the fastener for sealing the outer end of the opening. Advantageously also, a resilient Belleville washer element 84 is preferably disposed between the inner end of the fastener and the outer end of the filter assembly 34.

INDUSTRIAL APPLICABILITY

The baffle member 36 with the filter assembly 34 telescopically and fully received within it can be inserted horizontally along the axis 26 until initial contact is made between the projection 60 and the shoulder 48 of the case 12. With but a minor degree of rotation of the baffle member the projection is alignable with the depression 58 in the case. This permits the baffle member and filter assembly to be urged axially leftwardly when viewing FIG. 1 at a proper angular attitude to a position of full peripheral and seated engagement between the shoulders 42,48. The Belleville washer 84 is then installed within the opening against the outer surface of the filter assembly plate 68. The fastener 78 with its seal member 82 thereon are then screwthreadably inserted into the opening of the case to sealingly close it and to loadably bias the Belleville washer against the filter assembly. The resilient loading action of the Belleville washer maintains proper seating of the baffle member at the shoulders 42,48 and proper seating of the filter assembly within the baffle member while permitting a somewhat looser stack-up of dimensional tolerances between the parts.

In operation, the suction available in the intake passage 28 and associated annulus 30 within the case 12 is sufficient to cause fluid in the sump 14 to enter the screening device 10 only through the slot 54 adjacent the floor portion 32. Since the intake into the chamber 52 is located at a substantially maximized location from the fluid surface 18, then the turbulence is minimized and there is little or no opportunity for a vortex to be formed. Accordingly, fluid depth readings taken during routine service periods at the distal end of a dipstick as is illustrated in FIG. 1 at 86 can be expected to be an accurate indicator of the quantity of fluid available in the sump.

Accordingly, it can be appreciated that the intake screening device 10 of the present invention is simple and rugged in construction, is conveniently capable of being serviced from an external location, and provides improved flow characteristics despite a relatively low fluid operating level in the sump.

Other aspects, objects and advantages will become apparent from a study of the specification, drawings and appended claims.

We claim:
1. A fluid intake screening device (10) comprising:
    a case (12) defining a sump (14), an opening (20) therethrough having inner and outer ends (22,24) and an outwardly facing shoulder (48) therebetween, and an intake passage (28) communicating with the opening (20) intermediate the ends (22,24);
    a tubular filter assembly (34) including a tubular filter element (62) and a skeleton frame (64) of a construction sufficient for protectingly supporting the filter element (62) concentrically therewithin;
    a tubular baffle member (36) releasably connected to the case (12) and extending from the inner end (22) of the opening (20) into the sump (14), the baffle member (36) supporting the skeleton frame (64) of the filter assembly (34) concentrically therewithin and defining therewith a generally tubular chamber (52) therebetween, the baffle member (36) defining flow directing means (50) for controllably directing fluid flow from the sump (14) to the chamber (52) in a limited region of the baffle member (36); and
    closure means (38) for blocking the outer end (24) of the opening (20) and urging the skeleton frame (64) against the baffle member (36) and the baffle member (36) seatably against the shoulder (48) and alternatively permitting the removal of the filter assembly (34) and the baffle member (36) for servicing upon the release of the closure means (38) from the case (12).

2. The intake screening device (10) of claim 1 wherein the case (12) defines a depression (58) and the baffle member (36) defines a projection (60) receivable in the depression sufficient to locate the flow directing means (50) in a preselected angular attitude.

3. The intake screening device (10) of claim 2 wherein the flow directing means (50) is a slot (54) located by the projection (60) and depression (58) at the bottom of the baffle member (36).

4. The intake screening device (10) of claim 1 wherein the skeleton frame (64) has a flanged head portion (66) located at the intake passage (28).

5. The intake screening device (10) of claim 4 wherein the closure means (38) includes a fastener (78) screwthreadably received in the case opening (20) and a resilient element (84) located between the fastener (78) and the filter assembly (34).

6. The intake screening device (10) of claim 1 wherein the closure means (38) includes a releasable fastener (78) and a resilient member (84) bearable against the fastener (78) for urging the tubular filter assembly (34) against the baffle member (36), and the baffle member (36) seatably against the shoulder (48).

7. The intake screening device (10) of claim 1 wherein the baffle member (36) has a flanged head portion (40) engageable against the shoulder (48), and the skeleton frame (64) of the filter assembly (34) has a flanged head portion (66) engageable against the head portion (40) of the baffle member (36).

8. A fluid intake screening device (10) adapted for insertion into a case (12) defining a sump (14), an opening (20) therethrough having inner and outer ends (22,24), and an outwardly facing shoulder (48) therebetween, comprising:
- a tubular filter assembly (34) including a filter element (62) and a skeleton frame (64) of a construction sufficient for protectively supporting the filter element (62) concentrically therewithin;
- a tubular baffle member (36) supporting the skeleton frame (64) concentrically therewithin and being extendable from the inner end (22) of the opening (20) into the sump (14) and defining an opening (54) therethrough; and
- releasable closure means (38) for blocking the outer end (24) of the opening (20) and resiliently urging the skeleton frame (64) against the baffle member (36) and the baffle member (36) into seated engagement against the shoulder (48).

9. The fluid intake screening device of claim 8 wherein the closure means (38) includes a releasable fastener (78) and a resilient member (84) bearable against the fastener (78) and continually urging the skeleton frame (64) toward the shoulder (48).

10. The fluid intake screening device of claim 9 wherein the baffle member (36) has a flanged head portion (40) engageable against the shoulder (48) and the skeleton frame (64) has a flanged head portion (66) engageable against the head portion (40) of the baffle member (36).

11. The fluid intake screening device of claim 8 wherein the case (12) defines an intake passage (28) in communication with the opening (20), the filter assembly (34) and baffle member (36) being so constructed and arranged that, in use, fluid flows from the sump (14) into the opening (54) in a preselected region of the baffle member (36), inwardly through the filter element (62) and to the intake passage (28).

* * * * *